United States Patent
Pipkorn et al.

(10) Patent No.: US 7,416,043 B2
(45) Date of Patent: Aug. 26, 2008

(54) SAFETY ARRANGEMENT

(75) Inventors: Bengt Pipkorn, Sävedalen (SE); Yngve Haland, Falsterbo (SE)

(73) Assignee: Autoliv Developments AB, Vargarda (SE)

( * ) Notice: Subject to any disclaimer, the term of this patent is extended or adjusted under 35 U.S.C. 154(b) by 0 days.

(21) Appl. No.: 11/832,395

(22) Filed: Aug. 1, 2007

(65) Prior Publication Data
US 2008/0011536 A1 Jan. 17, 2008

Related U.S. Application Data

(63) Continuation of application No. PCT/SE2006/000100, filed on Jan. 25, 2006.

(30) Foreign Application Priority Data

Feb. 1, 2005 (GB) .................................. 0502074.8

(51) Int. Cl.
*B60K 28/10* (2006.01)
*B60T 7/12* (2006.01)
(52) U.S. Cl. ...................... 180/274; 293/129; 293/132
(58) Field of Classification Search ................ 280/735; 180/274; 293/129, 132
See application file for complete search history.

(56) References Cited

U.S. PATENT DOCUMENTS

| | | | | |
|---|---|---|---|---|
| 2,135,749 | A | * | 11/1938 | Gullo ......................... 267/162 |
| 3,146,014 | A | * | 8/1964 | Kroell ........................ 293/133 |
| 3,495,474 | A | * | 2/1970 | Nishimura et al. ............. 74/492 |
| 3,792,874 | A | * | 2/1974 | Ayres et al. ................. 280/735 |
| 3,862,669 | A | * | 1/1975 | Lindbert et al. |
| 3,922,002 | A | * | 11/1975 | Lindbert et al. |
| 4,050,537 | A | * | 9/1977 | Bez |
| 4,272,114 | A | * | 6/1981 | Hirano et al. ................ 293/133 |
| 4,346,914 | A | * | 8/1982 | Livers et al. |
| 4,518,183 | A | * | 5/1985 | Lee |
| 5,845,937 | A | * | 12/1998 | Smith |
| 6,113,178 | A | * | 9/2000 | Faigle |
| 6,189,941 | B1 | | 2/2001 | Nohr |
| 6,334,639 | B1 | | 1/2002 | Vives et al. |

(Continued)

FOREIGN PATENT DOCUMENTS

EP 0 788 930 A1 8/1997

(Continued)

*Primary Examiner*—Toan C To
(74) *Attorney, Agent, or Firm*—Brinks Hofer Gilson & Lione

(57) ABSTRACT

A safety arrangement for use in a motor vehicle comprises at least one plastically-deformable element, defining an interior chamber, which will deform only when subjected to at least a first predetermined force. A source of gas is connected to inject gas into the chamber and a signal generator is provided to generate a signal representative of crash severity which is to be applied to the element during a crash situation or in an anticipated crash situation. The signal generator is connected to a control unit so as to provide the control unit with the signal. The control unit is connected to the source of gas in order to control the source of gas and to inject gas into the interior chamber of the deformable element so as to increase the gas pressure in the chamber when the crash severity signal is substantially in excess of a predetermined threshold. The arrangement provides a structure whose energy absorption characteristics can be varied according to the severity of a crash situation.

25 Claims, 5 Drawing Sheets

U.S. PATENT DOCUMENTS

| | | | |
|---|---|---|---|
| 6,561,301 B1 * | 5/2003 | Hattori et al. | |
| 6,834,898 B2 * | 12/2004 | Wang et al. | 293/118 |
| 7,137,472 B2 * | 11/2006 | Aoki | |
| 7,204,336 B2 * | 4/2007 | Arlon et al. | |
| 7,232,002 B2 * | 6/2007 | Taya et al. | |
| 7,246,677 B2 * | 7/2007 | Fredriksson et al. | |
| 2003/0020289 A1 | 1/2003 | Dohrmann et al. | |
| 2007/0114772 A1 * | 5/2007 | Evans | |

FOREIGN PATENT DOCUMENTS

| | | |
|---|---|---|
| EP | 0 949 092 A1 | 10/1999 |
| EP | 1 400 436 A2 | 3/2004 |
| WO | WO 01/85527 A1 | 11/2001 |

\* cited by examiner

SAFETY ARRANGEMENT

CROSS REFERENCE TO RELATED APPLICATION

This application claims priority to PCT/SE2006/000100, filed 25 Jan. 2006 and GB 0502074.8, filed 01 Feb. 2005.

FIELD OF THE INVENTION

The present invention relates to a safety arrangement for a motor vehicle, and more particularly relates to a safety arrangement to minimise the risk of injuries in a crash situation.

In order to minimise the risk of injuries being sustained by a vehicle occupant in a crash situation, the occupant of the vehicle should be decelerated at as low peak and mean deceleration levels as possible, which means a mainly constant level during the whole crash event. Most modern motor vehicles include at least one restraint system to restrain an occupant within a seat in the cabin of the vehicle, and also most modern vehicles have arrangements which absorb kinetic energy at a substantially constant force level for the occupant during the accident situation.

A typical vehicle may be provided with a crumple zone which is, designed to be crushed or deformed during an accident situation, and the crumple zone may effectively be associated with the front bumper or rear bumper of the vehicle. The crumple zone is designed to be "softer" than the cabin of the vehicle with the intention that the crumple zone should crumple, absorbing energy, whilst the cabin of the vehicle remains un-deformed to protect the occupant.

In a simple, situation it could be considered that the stiffness of the crumple zone should be selected to give a relatively low value to the maximum decelerating force that will be applied to a vehicle occupant. The crumple zone may thus be designed so that the stiffness of the crumple zone is substantially constant over the whole length of the crumple zone. Thus the stiffness, as a function of the deformation length, that is to say the length by which the crumple zone has been compressed, is constant, and stiffness is not a function of impact speed.

Stiffness is, of course, related by a predetermined function to the force necessary to compress or deform the crumple zone, and for constant stiffness, the absorbance of energy during crumpling of the crumple zone will occur with a constant force.

If the force required to crumple a crumple zone is plotted against the length over which the crumple zone is compressed, for a constant stiffness the plot will be a horizontal line, with the energy absorbed being the integral beneath the, line. Thus, for a greater stiffness, a greater force is required to crumple the crumple zone, and a greater amount of energy will be absorbed for the same length of compression.

It is to be understood that the energy to be absorbed in a typical accident situation is related to the speed of the accident. The speed of the accident is the relative speed between the vehicle under consideration, and the object with which the vehicle collides. It can be understood that in a low speed collision the crumple zone may only be partially compressed or deformed, where as in a higher speed impact the crumple zone may be completely compressed.

Any particular crumple zone of constant stiffness may be considered to be optimised for a certain crash speed, that is to say the crash speed at which the crumple zone is almost totally crumpled or compressed. If the crumple zone is totally crumpled or compressed, the crumple zone will have absorbed a maximum amount of energy.

For a higher crash speed, the crumple zone will be totally compressed and other, stiffer parts of the vehicle will then absorb the remaining kinetic energy, but, with energy being absorbed by stiffer parts of the vehicle, the cabin of the vehicle may be subjected to very severe deceleration and may be deformed. This is, of course, undesirable since severe deceleration imparted, by the cabin, to the occupant may cause injuries, and if the cabin deforms, again the consequence may be injuries for the cabin occupant.

The present invention seeks to provide an improved safety arrangement.

SUMMARY OF THE INVENTION

According to the present invention there is provided a safety arrangement for use in a motor vehicle, the safety arrangement comprising a deformable element which defines at least one interior chamber and which is adapted to be mounted on a vehicle in a position where the element may be deformed in a crash situation, the deformable element being configured to be partially deformed (e.g. by at least 20% of its initial length) in a crash of a predetermined severity, the safety arrangement further comprising a source of gas connected to inject gas into the or each said chamber and a sensor arrangement to generate, from one or more sensed parameters, a crash severity signal, the signal being representative of the expected severity of a crash, the sensor arrangement being connected to control the source of gas to supply gas to the or each chamber in response to a crash severity signal representative of an expected severity of crash substantially higher than the said predetermined severity.

Preferably the sensor arrangement is connected to control the source of gas in such a way that if gas is to be supplied to the or each chamber, then the gas is supplied to the or each chamber before the deformable element starts to deform in an accident situation.

Conveniently the deformable element has a predetermined range of deformation, (e.g. a deformation by 70% to 95% of its original length) and the sensor arrangement is connected to control the source of gas to supply to the or each chamber in response to a signal representative of an expected severity of crash that would lead to the deformable element being deformed by at least 50% of its predetermined range of deformation. Preferably the gas is only supplied if the expected severity of the crash is such that the deformable element is expected to be almost totally deformed, or deformed to such an extend that the stiffness of the deformable element will increase significantly.

Advantageously the sensor arrangement senses the relative speed between a motor vehicle and an impacting object, the crash severity signal being related to the sensed relative speed.

In one embodiment the sensor arrangement incorporates a radar to sense the relative speed.

Conveniently the radar is doppler radar.

In an alternative embodiment the sensor arrangement incorporates a speed sensor provided in a bumper of a vehicle.

Preferably the sensor arrangement senses one or more parameters of a potentially impacting object selected from the direction of the object relative to the motor vehicle, the height of the object, and the width of the object, the crash severity signal being dependent upon the sensed parameter or parameters.

Conveniently a processor is provided to process one or more signals from the sensor arrangement to determine or estimate the mass and/or stiffness of a potentially impacting object, the crash severity signal being at least partially dependent upon said mass and/or stiffness.

Advantageously the deformable element is provided with a controllable vent, the controllable vent being controlled by the sensor arrangement.

Conveniently the safety arrangement incorporates at least two said deformable elements, the elements being spaced apart, the sensor arrangement being adapted to control the supply of gas to each deformable element individually.

Preferably the two said deformable elements carry a bumper or fender.

Advantageously the sensor arrangement senses the lateral position of a potentially impacting object, the quantity of gas supplied to each deformable element being determined in dependence upon the off-set.

Conveniently the off-set is substantial, the sensor arrangement will control the supply of gas so that gas is supplied only to one of the two deformable elements.

In one embodiment there are four deformable elements, arranged as two upper elements and two lower elements.

Preferably the source of gas associated with the or each element is multiple stage gas generator, the stages of the gas generator being activated in response to increasing values of the crash severity signal.

Alternatively the source of gas to supply gas to the or each said element is a continuously variable, supply, the quantity of gas supplied to each element being related to the magnitude of the crash severity signal.

In one embodiment the or each deformable element is substantially cone-shaped.

Preferably each deformable element is defined by a plurality of cylindrical open-ended tubular sections of increasing diameter which are connected together to extend from a sealed base to an end plate.

In an alternative embodiment the or each deformable element is substantially cylindrical, having a plurality of narrow neck portions that divide the deformable element into a plurality of collapsible sections.

Conveniently the deformable element has two neck portions which divide the deformable element into three collapsible sections.

Preferably the or each deformable element has a substantially constant stiffness over a substantial part of its range of deformation.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
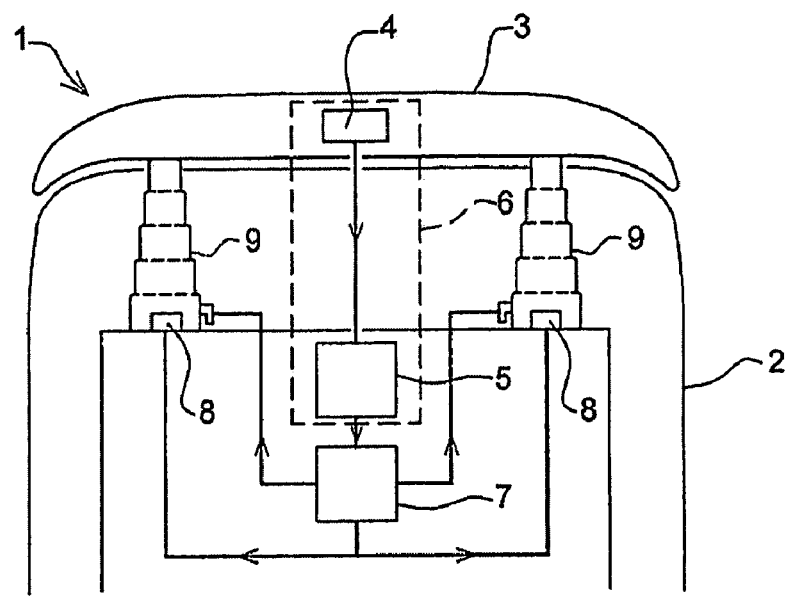
FIG. 1 is a diagrammatic horizontal sectional view of part of a vehicle on which a safety arrangement in accordance with the invention is mounted.

The preferred embodiments of the invention, which will be described below, provide a safety arrangement in which one or more energy-absorbing elements are provided which are intended to be compressed or crumpled in an accident situation to absorb energy. The energy-absorbing elements will be described as being associated with the front or rear bumpers of a vehicle but the energy-absorbing elements may be used at many different positions within a motor vehicle and may, effectively, be positioned between the seat of the vehicle and the vehicle itself, or may be located between the back-rest of the vehicle and the seat of the vehicle, or between the fixing points of the safety-belt and the vehicle. The energy-absorbing elements are designed to absorb all of the energy expected to be experienced in an accident within a range of severity. It is to be understood that in a very minor accident, the front or rear bumpers of the vehicle will absorb the impact, without the energy-absorbing elements being deformed in any way. However, once an impact is greater than a minor impact, the deformable elements will deform. The degree of deformation of the deformable elements will depend upon the energy of the impact. Each deformable element has a predetermined configuration, and may be substantially deformed, but there is, of course, a limit to the deformation that can occur. Thus, there is a predetermined range of deformation for each of the deformable elements (which could be a deformation by about 90% of its initial length). It is to be appreciated that in an accident where the severity of the accident is only slightly greater than that which can be absorbed by the bumpers, the deformable element will only be very slightly deformed. In an accident of slightly greater severity, a predetermined severity, the deformable element will be partially deformed, and may thus be deformed, for example, by about 25% of its range of deformation. In an accident of much greater severity the deformable element will be totally deformed, that is to say the deformable element will be deformed over its total range of deformation and will be capable of no further deformation. When the deformable element approaches its limit of deformation the resistance to deformation, or effective stiffness, rises substantially.

A sensor arrangement is provided to sense an accident and to determine if the accident has a severity substantially in excess of the predetermined severity and, if a very severe accident of this type is sensed, then the stiffness of the energy-absorbing elements is increased immediately, thus increasing the total energy-absorbing ability of the energy-absorbing elements during the accident. The stiffness of the elements is increased by supplying high pressure gas to one or more chambers present within each energy-absorbing element. The gas supply should preferably only be activated if the expected crash severity would lead to the element being deformed at least 90%-95% of its deformation range. The gas should be supplied if the severity of the accident is such that it is expected that the stiffness of the element will start to increase significantly.

In a situation where the energy-absorbing elements are associated with front or rear bumpers of the vehicle, it is envisaged that in a very low speed impact the bumper itself may deform resiliently, without the energy-absorbing elements being deformed in any way. In an accident of moderate severity the bumper will be deformed, but also the energy-absorbing elements will be deformed, absorbing energy as they are deformed over a substantial proportion of their total available range of deformation, thus gradually decelerating the cabin of the motor vehicle, and minimising the risk of the occupant of the cabin being injured.

In a very severe accident, the stiffness of the energy-absorbing elements is increased, and the energy-absorbing elements will then be deformed over a substantial part of the available range of deformation, absorbing energy. In such a situation the cabin of the vehicle may be decelerated relatively rapidly, which may cause slight injury to the occupant of the vehicle, but it is envisaged that the injury experienced by the occupant would be much less than the injury which would be experienced if the energy-absorbing element became totally compressed, whilst absorbing only part of the energy of the accident, with the consequence that some energy would be absorbed as a consequence of deformation of extremely stiff parts of the structure of the vehicle, such as the parts of the vehicle that define the cabin of the vehicle.

Turning now to the accompanying drawings and referring initially to FIG. 1, a safety arrangement 1 in accordance with a preferred embodiment of the invention is illustrated as, provided in a vehicle 2. The vehicle 2 has a bumper or fender 3, which supports a sensor 4. The sensor 4 is an accelerometer which is capable of sensing deceleration of the vehicle in a crash situation.

In other embodiments the sensor 4 may be mounted elsewhere on the vehicle. Also, in alternative embodiments, the sensor 4 may sense various parameters in a crash situation or an anticipated crash situation other than acceleration or deceleration. The sensor 4 may thus be a doppler radar to sense the speed of the vehicle relative to an object which will be involved in a crash situation. Any type of sensor may be used that can predict or sense an accident, and that can somehow assess the severity of the predicted or sensed accident. The sensor may sense one or more parameters of a potentially impacting object such as the direction of the object relative to the motor vehicle, the height of the object and the width of the object, and may also sense if the object is off-set from the axis of the vehicle.

The sensor 4 is connected to a processor 5, to form a signal generator 6 whose function will be described in detail below. The signal generator 6 is connected to a control unit 7, and the control unit 7 is connected to two identical multiple stage gas generators 8. The gas generators 8 are each connected to supply gas to a respective one of two identical deformable elements 9. The deformable elements 9 are each positioned between an inboard face of the bumper 3 and a rigid part of the vehicle's chassis.

In a typical crash situation a force may be exerted on the outboard face of the bumper 3, which is sufficiently large to cause the bumper 3 to move and deform the deformable elements 9 against a rigid part of the vehicle, with the deformable elements 9 absorbing energy as they are deformed.

Figure 2:
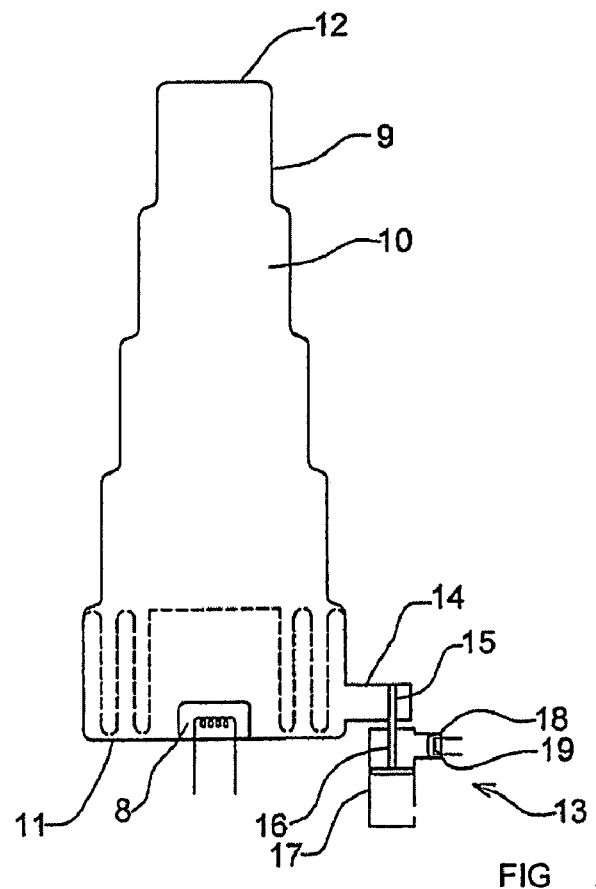
FIG. 2 is a diagrammatic sectional view of a deformable element, in its normal state, for use in the preferred embodiment of the invention (the lines in phantom indicate the element in a deformed state)

One of the deformable elements 9 may be seen more clearly in FIG. 2.

Each deformable element 9 is substantially cone-shaped and defines an interior chamber 10. The deformable element 9 has a circular planar base 11 onto which a gas generator 8 is mounted. The base 11 is mounted on the vehicle chassis. The gas generator 8 is positioned to inject gas into the chamber 10 and, in this preferred embodiment, is actually mounted inside the chamber 10. However, the gas generator 8 may alternatively be positioned separately from the deformable element 9, but connected via a pipe to inject gas into the chamber 10.

The cone-shape of the deformable element 9 is defined by a plurality of cylindrical open-ended tubular sections of decreasing diameter which are connected together to extend from the base 11. The base 11 seals, with a substantially gas-tight fit, an open end of the largest cylindrical section of the element 9. One open end of the smallest cylindrical section of the element 9 is sealed with an end plate 12 to form a gas-tight fit. The end plate 12 is connected to the bumper 3.

A controlled vent 13 is positioned in the side wall of the deformable element 9. The controlled vent 13 may be any type of controlled vent which is known in the art. In this preferred embodiment, the controlled vent 13 is formed from a vent tube 14 which is normally closed by a moveable shutter 15. The shutter 15 is connected to a piston 16 which has a head that is slideably mounted in a cylinder 17. A pyrotechnic charge 18 is positioned within the cylinder 17 on one side of the head of the piston 16. A squib 19 is located within the pyrotechnic charge 18 and connected to receive a venting signal from the control unit 7. When the control unit 7 sends a venting signal to the squib 19, the squib 19 ignites the pyrotechnic charge 18 which burns to produce a volume of gas that increases the gas pressure on one side of the head of the piston 16. This increase in pressure exerts a force on that side of the piston 16, causing the piston 16 to move within the cylinder 17 and pull the shutter 15 at least partly out from the vent tube 14, thus opening the vent 13.

During normal vehicle operation, the deformable element 9 of this preferred embodiment is substantially cone-shaped and undeformed, such that, when the bumper of the vehicle is struck and a substantial force is applied to the end plate 12, the, deformable element 9 deforms. If the force is aligned with the axis of the cone, the tubular sections of the cone may become inter-nested together (as shown by the lines in phantom of FIG. 2).

Each deformable element is designed so that over a substantial part of its range of deformation, for example over 80% of its range of deformation, the deformable element presents a substantially constant stiffness, for example a stiffness that does not vary by more than 15% from a nominal stiffness value.

In the event that a typical crash situation occurs, the front of the vehicle 2 will undergo a rapid deceleration. The sensor 4 measures the deceleration of the front of the vehicle 2 and produces a signal indicative, of the level of deceleration fed into the processor 5. Integrating this deceleration would give the relative speed of the impacting objects. If a complex sensor arrangement is provided, then various other signals may be provided to the processor. For example the processor may be provided with a signal representative of the direction of a potentially impacting object relative to the motor vehicle itself. The direction of an object may give an indication as to whether the anticipated impact is "frontal" impact or a "inclined" impact, or even a "side" impact. Also the processor may receive signals representative of the height and the width of the object, enabling the processor to determine the potential size, of the object and therefore determine the potential mass and the potential stiffness of the object. In certain embodiments the sensor may also determine if the object is off-set from the central axis of the vehicle.

The processor 5 generates a signal which is representative of the expected severity of the crash. The severity of the crash Will depend upon a combination of parameters, and the precise nature of the crash severity signal will, depend upon the information provided to the processor and the logic applied to that information within the processor. Nevertheless, the crash severity signal can be expected to be high if the vehicle is travelling at a high speed or if its front is undergoing high deformation speed, and is also expected to be high if the potentially impacting object is very high and very wide, thus potentially having substantial mass. The compression force, as a function of length, is independent of crash severity. The signal indicative of the crash severity is fed into the control unit 7.

The control unit 7 compares the crash severity signal level with a predetermined threshold. If the signal level is below the threshold level, (for example, if the crash is a low-speed crash) the control unit 7 does not produce an actuation signal to the gas generators 8. In this situation, the gas pressure within the chamber 10 of the element 9 is not raised and remains at its normal level, to allow the deformable element 9 to be deformed in the low speed crash situation, and absorb energy from the crash situation.

If the predicted severity level of the crash is in excess of the predetermined threshold (for example, if the crash is a crash of medium severity), the control unit 7 sends a first control signal to the gas generators 8 and also to the controlled vents 13 to control the gas generators 8 and the vents to raise the gas pressure within the chambers 10 of the elements 9. The increased gas pressure within the elements 9 makes the elements 9 stiffer and harder to deform, and the deformable elements 9 are thus able to absorb a greater amount of energy as they are deformed by the force from the medium severity crash. The vent 13 may be opened, to prevent the pressure in the chambers 10 from becoming excessively high.

If the vehicle 2 is involved in a very severe crash situation, the signal generator 6 generates an appropriate signal level, which is further in excess of the predetermined threshold level. The control unit 7 processes this signal and transmits a second control signal to the gas generators 8 and the controlled vents 13 to raise the pressure of gas within the elements 9 to a very high level. The controlled vents 13 may open to a limited extent, or may open only relatively late during the crash, to ensure that the very high gas pressure is maintained within the chambers 10. This high pressure of gas within the elements 9 makes the elements 9 even harder to deform. The elements 9 are thus able to absorb more energy as they are deformed, and absorb the greater amount of energy involved in the severe crash situation.

In this embodiment, each gas generator 8 is a two stage gas generator which generates either a first volume of gas in response to the first control signal, or a second, larger volume of gas in response to the second control signal. The first volume of gas is generated by actuation of one of the stages of the gas generator 8. The second, larger, volume of gas is generated by actuation of both stages of the gas generator 8. In other embodiments, the gas generators 8 may only be a single stage gas generator, or alternatively be a multiple stage gas generator with more than two stages.

In this preferred embodiment the gas generator 8 generates a pressure of 20 bar within the deformable element 9, if only one stage of the gas generator 9 is actuated. If both stages of the gas generator 8 are actuated, the gas generator 8 produces gas to raise the pressure within the deformable, element 9 to 40 bar.

The controlled vents 13 release gas from their respective deformable elements 9 in response to a signal from the control unit 7. In some embodiments the control unit 7 provides a venting signal to the controlled vent 13, to open the vent 13 after a predetermined time has elapsed after any crash. Gas may, thus, be controllably released from within the element 9, as the element 9 concludes its function of absorbing energy from the crash situation. Thus, the deformable element 9 is prevented from bursting, or acting as a resilient element, which may cause the vehicle to bounce back off the object into which it has collided. The controlled vent 13 may also be opened at an appropriate instant to control the maximum pressure within the element 9 as gas is supplied to the element.

Figure 3:
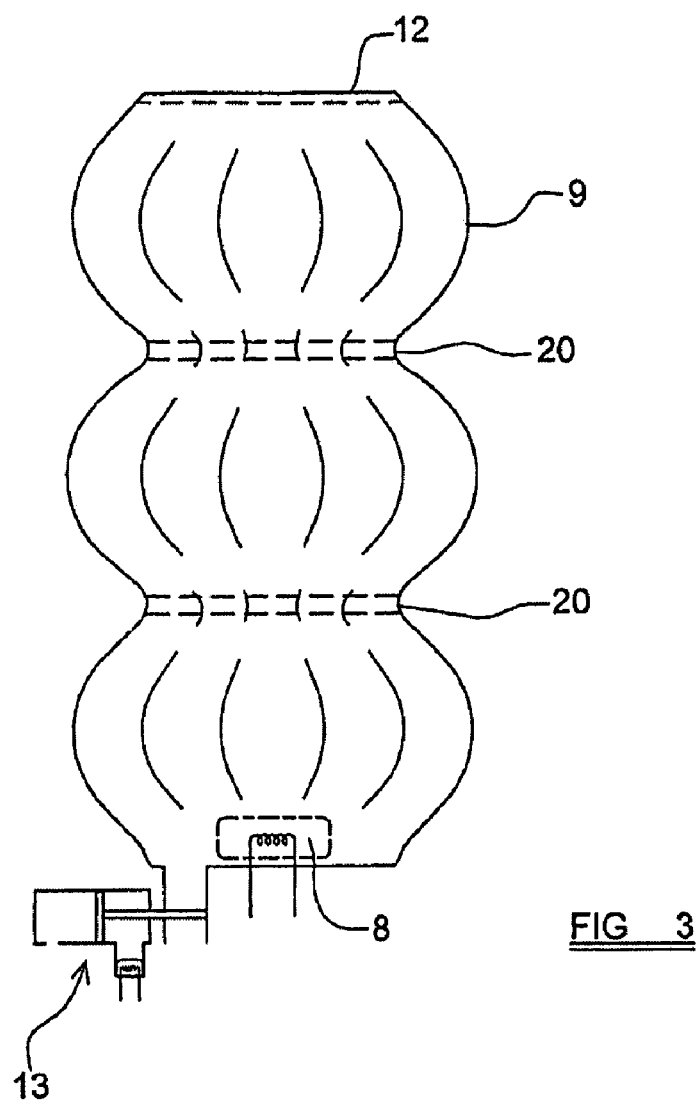
FIG. 3 is a diagrammatic side view of an alternative deformable element in its normal state, for use in an embodiment of the invention (with a gas generator being shown in phantom)
Figure 4:
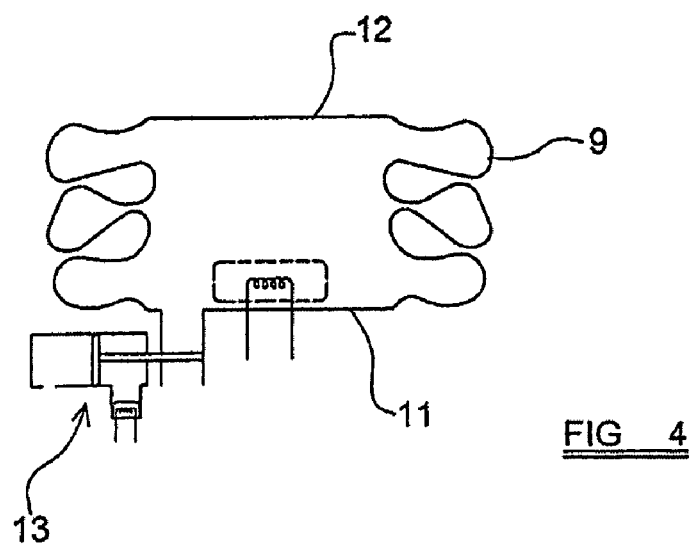
FIG. 4 is a diagrammatic sectional view of the element shown in FIG. 3, with the element being shown in a deformed state.

Whilst, in the embodiment described above the deformable element 9 is substantially cone-shaped, the deformable element 9 may alternatively be of bellow shape, as can be seen in FIGS. 3 and 4. The deformable element 9 of this alternative embodiment is generally cylindrical, but with two narrow portions or "necks" 20 that divide, the deformable element 9 into three collapsible sections. In the event that a force is applied to the end plate 12 of the deformable element 9 of this alternative embodiment, the deformable element 9 becomes compressed as the collapsible sections collapse, until the end plate 12 is close to the base 11, as shown in FIG. 4. Instead of collapsing in on itself like the deformable element 9 of the preferred embodiment, the deformable element 9 of this alternative embodiment deforms outwardly, as the collapsible sections collapse. Again the deformable element is preferably designed to give a substantially constant stiffness over a substantial part of the range of deformation of the deformable element.

Figure 5:
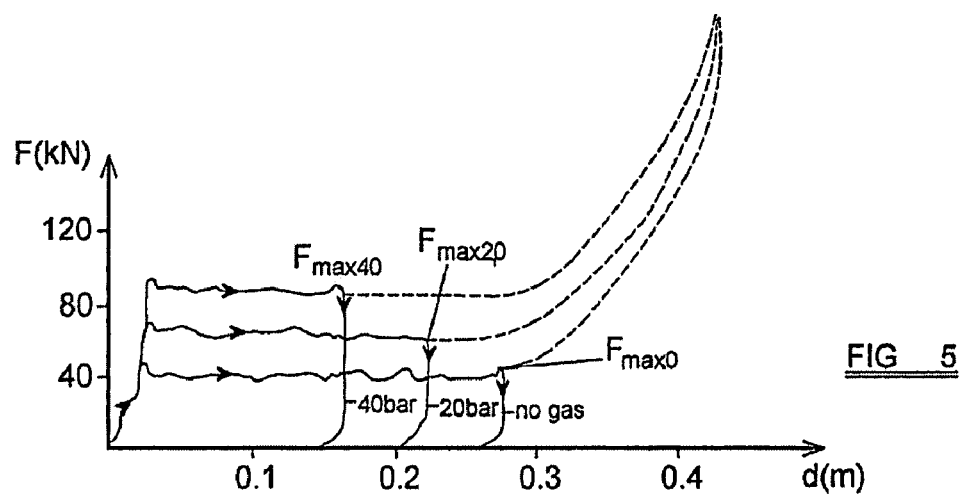
FIG. 5 is a graphical representation of the force exerted by an energy absorbing arrangement including a deformable element of the type shown in FIGS. 1 to 4 against the distance through which the element deforms, for a crash speed of 25 km/h and for different amounts of gas.
Figure 6:
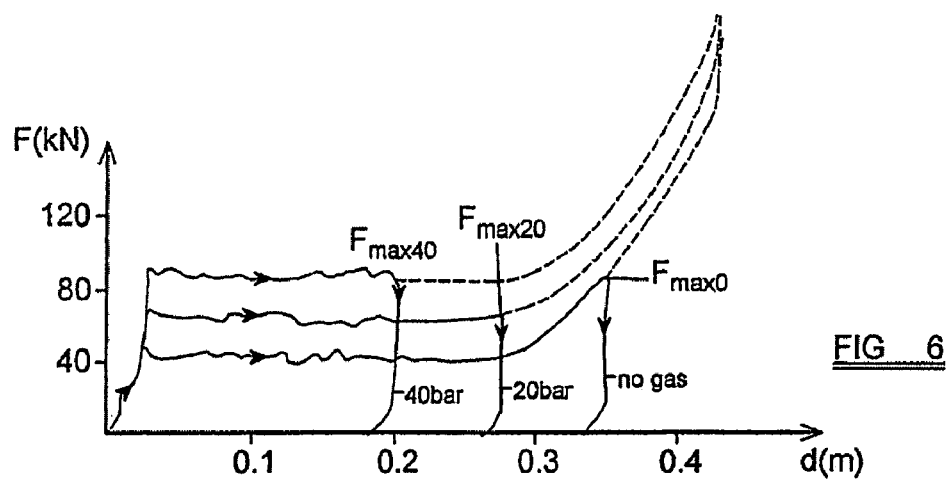
FIG. 6 is a graphical view corresponding to FIG. 5 for a crash speed of 35 km/h.
Figure 7:
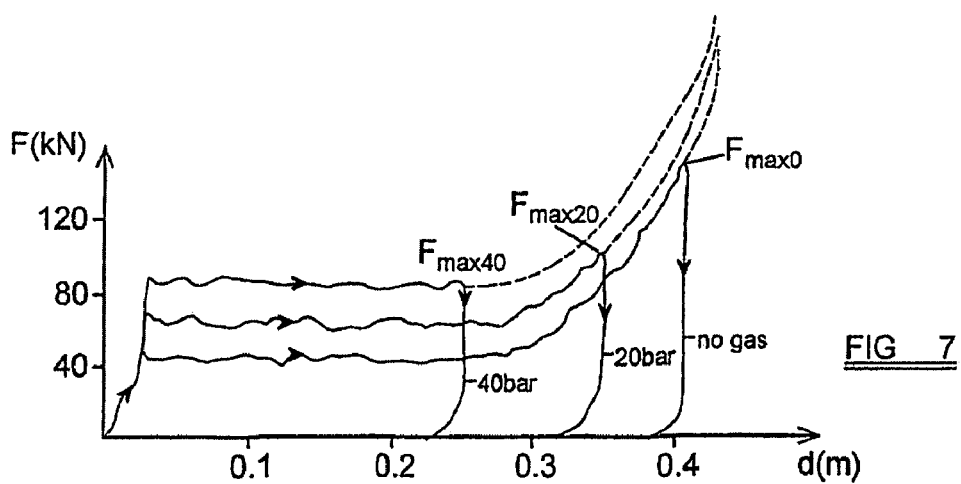
FIG. 7 is a graphical view corresponding to FIG. 5 for a crash speed of 50 km/h.

Referring now to FIGS. 5 to 7 of the accompanying drawings, the distance over which the deformable element 9 is deformed in a crash situation is plotted against the force exerted on the deformable element 9 as it is being deformed. In order for the deformable element 9 to absorb energy in a manner which provides optimum protection for a vehicle occupant, the force which deforms the deformable element 9 should be as low as possible, to ensure that the deformable element 9 deforms and absorbs energy over most or all of the available range of deformation. Ideally, in any accident, all of the energy of the accident should be absorbed as the deformable elements are completely crushed, enabling the vehicle occupant to be decelerated a the lowest possible level. In a practical situation, the pressure of gas within the deformable elements should be such that during the accident the deformable elements are deformed by between 70% and 90% of the available range of deformation, so that the deformable elements can provide lowest possible decelerating level, without there being any substantial risk that the deformable elements will become totally collapsed, causing energy to be absorbed by a very stiff part of the vehicle, since if this occurs the vehicle occupant may be exposed to a very high deceleration, which is clearly disadvantageous. The force needed to deform the deformable element 9 is a function of the pressure of the gas within the deformable element 9, and thus the safety arrangement is able to adjust the required force by adjusting the pressure of gas within the deformable element 9.

FIG. 5 is a graphical representation indicating the force required to deform an energy absorbing arrangement which includes a deformable element 9 in a low speed crash of 25 km/h when the deformable element is not supplied with any gas, and when the element 9 is supplied with gas at pressures of 20 bar and 40 bar. The energy absorbing arrangement also includes one or more relatively stiff components that will be deformed after the deformable element 9 has been totally collapsed by the deformation.

It is to be observed that, regardless of the degree of pressurisation of the deformable element 9, the initial deformation of the total system is effected as deformation of the bumper. The initial deformation of the bumper is a resilient deformation to cope, for example, with low speed knocks during parking.

If the deformable element is not supplied with any gas, in the low speed crash exemplified the force required to deform the deformable element over the total length of deformation remains substantially constant and thus the maximum force $F_{max0}$, is the same as the force used during the deformation and is for this example therefore about 40 kN, as shown in FIG. 5. For other cars and designs, other force levels may be relevant. If, on the other hand, the deformable element is pressurised to a pressure of 20 bar, the deformable element is stiffer and the total degree of deformation of the deformable element in the exemplified accident is less than the degree of deformation of the unpressurized deformable element. However, the force required to deform the deformable element is increased, and here it can be seen that the maximum force $F_{max20}$, is approximately 70 kN.

Again, if the deformable element is pressurised to a pressure of 40 bar, the distance over which the deformable element is deformed is further reduced, but the force is increased, and it can be seen that $F_{max40}$ is approximately 90 kN.

Turning now to FIG. 6 which represents a higher speed crash of 35 km/h, it is to be understood that the degree of deformation of the deformable element, at each pressurisation, will be greater than in the previous example illustrated in FIG. 5. It is thus to be seen that with no compressed gas present in the deformable element, the deformable element deforms to the totality of the available deformation, and then relatively stiff parts of the energy-absorbing arrangement begin to deform, and consequently the force that is exerted to complete the total deformation begins to rise. It can be seen, that in the example given, the maximum force, with no gas, $F_{max0}$ is approximately 75 kN.

In contrast, if the deformable element is pressurised to a pressure of 20 bar, the deformable element will be almost totally compressed in an accident of this severity, but the maximum force exerted during the compression $F_{max20}$ is still only 70 kN. In the case that the deformable element is pressurised to 40 bar, the length of the deformation is further reduced, although the length of the deformation is greater than the length of deformation at a pressure of 40 bar as shown in FIG. 5. Nevertheless, the maximum force $F_{max40}$ is, again, 90 kN.

Turning now to FIG. 7, which illustrates an even higher speed crash of 50 km/h, it is to be seen that in such a situation if there is no compressed gas in the deformable element, the deformable element is totally compressed or deformed and there is then substantial deformation of very stiff parts of the energy-absorbing element, meaning that a very substantial force is experienced. The maximum force, $F_{max0}$ is in excess of 140 kN. Also it is to be observed that with the deformable element pressurised to a pressure of 20 bar, the deformable element is completely deformed, and relatively stiff parts of the energy-absorbing element commence deformation, and in such a case, the maximum force experienced $F_{max20}$, is in the region of 95 kN. However, if the deformable element 90 is deformed to a pressure of 40 bar, the deformable element is very stiff, and even at this relatively high speed accident the deformable element is not completely deformed. Thus the deformable element absorbs a substantially constant force and the maximum force experienced $F_{max40}$ is still 90 kN.

It is thus to be appreciated that optimum deceleration, that is to say a deceleration which has a low maximum value, is achieved in a low speed accident, as shown in FIG. 5, with no pressurisation of the deformable element, in a moderate speed accident, as shown in FIG. 6, by a moderate inflation of the inflatable element and in a high speed accident, as shown in FIG. 7, by a high pressurisation of the deformable element.

It is thus to be understood that in one preferred embodiment the control unit 7 does not actuate the gas generator 8 if a low severity crash is sensed. A low severity crash occurs when the speed of the crash is less than 30 km/h. The control unit 7 provides the first control signal to actuate one stage of the gas generator 8 when a medium severity crash is sensed. A medium severity crash occurs when the speed of the crash is between 30 km/h and 45 km/h. The control unit 7 provides the second control signal to the gas generator 8 to actuate both stages of the gas generator 8 when a crash of high severity is sensed. A crash of high severity occurs when the speed of the crash is greater than 45 km/h.

Figure 8:
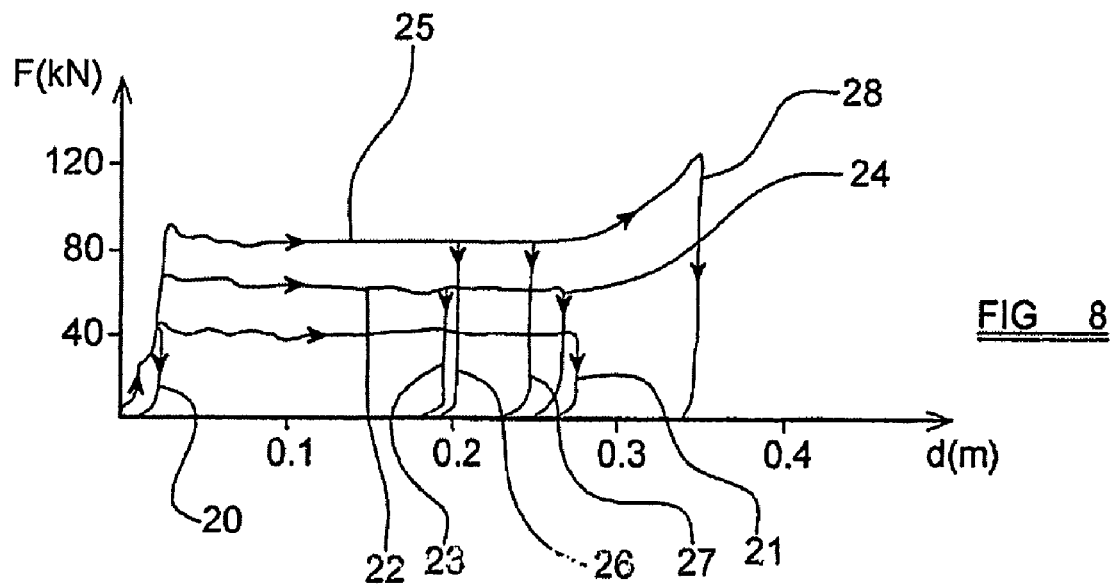
FIG. 8 is a graphical view corresponding to FIG. 5 provided for purposes of explanation.

Referring now to FIG. 8, in a low speed impact of up to 8 km/h, the bumper will deform resiliently and will return to the initial condition, as shown by lines 20.

With an impact of up to 25 km/h, the bumper will deform, and subsequently, with no gas being supplied, the deformable element will deform at a substantially constant force level until the deformation is complete as shown by line 21.

In an accident at, say, 30 km/h, the pressure of the deformable element will be raised to 20 bar, and the deformable element will deform along the lines 22, 23. At speeds of up to 35 km/h, the deformable element will deform along the line 22, with the final deformation at a speed of 35 km/h being shown by the line 24.

At a speed of 45 km/h, the deformable element will be inflated to a pressure of 40 bar and the deformation will follow the lines 25, 26. Deformation will continue to follow this line, with the final stage of deformation at a speed of 50 km/h being shown by the line 27. The line 28 illustrates the situation for an accident speed of 70 km/h, where stiff parts of the energy-absorbing arrangement become deformed after the deformable element 9 has become totally collapsed.

Figure 9:
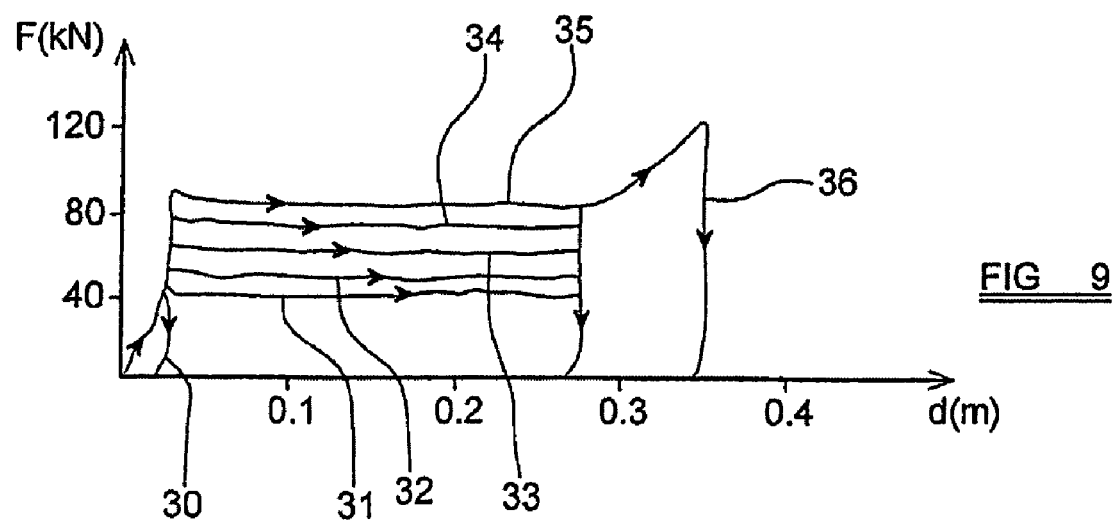
FIG. 9 is another graphical view corresponding to FIG. 5 given for purposes of explanation.

Whilst the invention has been described with reference to embodiments in which three available, gas pressures are provided, that is to say ambient 20 bar and 40 bar it is envisaged that in one embodiment of the invention a variable gas generator may be utilised so that the pressure within the deformable element 9 may be very closely selected to correspond to the anticipated force level, providing optimum energy absorbance at all speeds. FIG. 9 illustrates an embodiment of this type. Again the initial line 30 illustrates a situation at an impact of less than 8 km/h which the bumper deforms resiliently and returns to its initial condition. The line 31 shows deformation of the deformable element with no pressurised gas present within it, in an accident situation at 25 km/h. This line corresponds to the line 21 of FIG. 8. If an accident situation occurs at more than 25 km/h, the pressure within the deformable element may be raised slightly so that, for example, at a speed of 30 km/h the line 32 is followed. If a more severe accident is sensed, then the pressure can be further raised, and the line 33 will be followed at an accident of 35 km/h. Again, should a more severe accident occur the pressure within the deformable element may be raised to a higher level, and the line 34 will be appropriate, for accidents of about 45 km/h.

If a high speed accident of 50 km/h is sensed, then the pressure is further raised and line 35 will be followed, and finally in a very severe impact of 70 km/h the line 36 will be followed, this line corresponding with the line 27 of FIG. 8.

Figure 10:
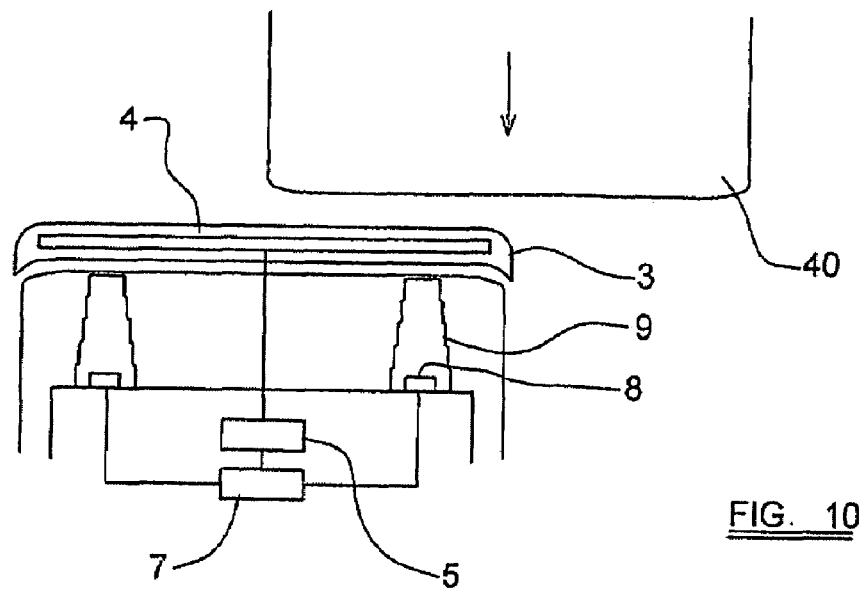
FIG. 10 is a diagrammatic horizontal sectional view of a vehicle provided with a safety arrangement in accordance with the invention at the commencement of an accident situation.

FIG. 10 illustrates a vehicle provided with a safety arrangement as described with reference to FIG. 1 when involved in an off-set impact with another vehicle 40. The other vehicle 40 will, as can be seen from FIG. 10, strike the front bumper 3 towards one side of the bumper, the other side to the bumper not being impacted.

Figure 11:
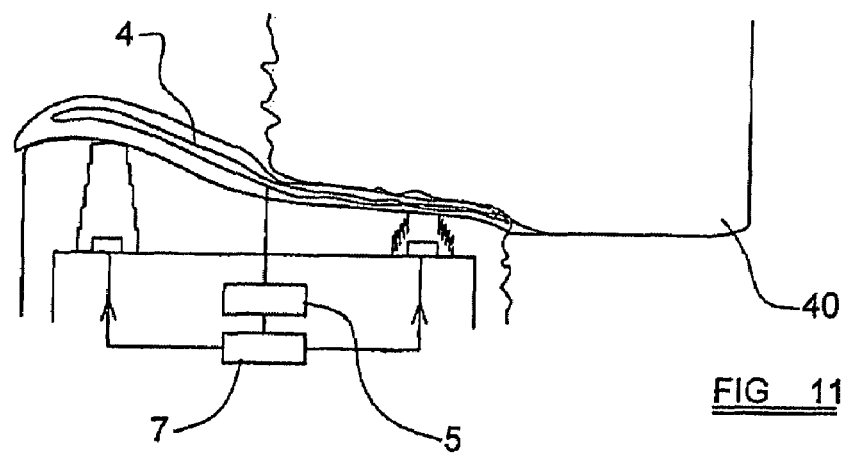
FIG. 11 is a view corresponding to FIG. 10 showing the vehicle at the termination of the accident situation.

It is to be appreciated that the sensor 4 and processor 5 will generate a force signal dependent upon the anticipated severity of the impact, and will provide an appropriate quantity of gas to each of the deformable elements 9. However, the force applied, to the bumper 3 during the accident situation is such that a large proportion of the force will be experienced by the deformable element 9 shown to the right in FIG. 10, with a lesser part of the force being experienced by the deformable element 9 shown to the left in FIG. 10. Consequently it is envisaged that the situation as shown in FIG. 11 may be achieved in which the whole of the energy of the accident has effectively been absorbed by the deformable element 9. However, because the anticipated force levels were calculated on the assumption that the force would be absorbed by both of the deformable elements 9, there is a substantial risk that the cabin of the vehicle may become damaged.

Consequently, in an off-set accident situation of the type illustrated it is preferred for the sensor arrangement to be capable of determining the degree of off-set and calculating the force that will be applied to each of the deformable elements 9 such that each deformable element 9 may be pressurised appropriately. In this way both of the deformable elements will deform substantially completely, absorbing energy in an optimum manner.

Figure 12:
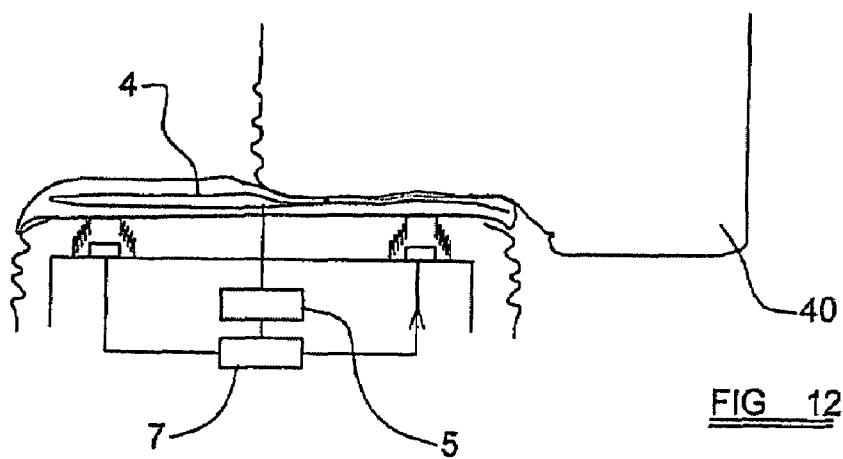
FIG. 12 is a view corresponding to FIG. 10 of an improved version of the embodiment of FIG. 10 showing the vehicle at the termination of the accident situation.

It is to be appreciated that in a situation such as that illustrated in FIG. 10, in which the impacting object is off-set by a substantial extent relative to the axis of the vehicle provided with the safety arrangement, the situation may be that gas is supplied to the deformable element which is aligned with the impacting object, so that deformable element is capable of withstanding a substantial amount of energy, whilst no gas at all is provided to the other deformable element, thus enabling the other deformable element to deform, whilst absorbing at least some of the energy of the accident situation, as shown in FIG. 12.

In another embodiment a bumper on a vehicle may be supported by four deformable elements of the type described above, the elements being arranged as two upper elements and two lower elements.

While the above description constitutes the preferred embodiment of the present invention, it will be appreciated that the invention is susceptible to modification, variation, and change without departing from the proper scope and fair meaning of the accompanying claims.

The invention claimed is:

1. A safety arrangement for use in a motor vehicle, the safety arrangement comprising a deformable element which defines at least one interior chamber and which is adapted to be mounted on the vehicle in a position where the element may be deformed in a crash situation, the deformable element being configured to be deformed in a crash, a source of gas connected to inject gas into the chamber and a sensor to generate, from one or more sensed parameters, a crash severity signal representative of the expected severity of a crash, the sensor being connected through a processor to control the source of gas to supply the gas to the chamber in response to the crash severity signal representative of an expected severity of crash higher than a predetermined severity wherein the supply of the gas causes the stiffness of the deformable element to increase and the processor controls the source of gas such that the gas is supplied to the chamber before the deformable element starts to deform in an accident situation in which the crash severity signal is above the predetermined severity.

2. A safety arrangement according to claim 1, wherein the deformable element has a predetermined range of deformation, and the processor controls the source of gas to supply gas to the chamber in response to the signal representative of the predetermined severity being of a magnitude that would lead to the deformable element being deformed by at least 50% of its predetermined range of deformation.

3. A safety arrangement according to claim 1, wherein the sensor arrangement senses the relative speed between the motor vehicle and an impacting object, the crash severity signal being related to the sensed relative speed.

4. A safety arrangement according to claim 3 wherein the sensor incorporates a radar sensor to sense the relative speed.

5. A safety arrangement according to claim 4 wherein the radar sensor is a doppler radar sensor.

6. A safety arrangement according to claim 3 wherein the sensor incorporates a deformation speed sensor provided in a bumper of a vehicle.

7. A safety arrangement according to claim 1, wherein the sensed parameters include one or more of the direction of the object relative to the motor vehicle, the height of the object, and the width of the object.

8. A safety arrangement according to claim 7 wherein a processor is provided to process one or more crash sensor signals from the sensor to determine or estimate the mass or stiffness of a potentially impacting object, the crash severity signal being at least partially dependent upon the mass or stiffness.

9. A safety arrangement according to claim 1, wherein the deformable element is provided with a controllable vent, the controllable vent being controlled by the processor in response by the sensor arrangement.

10. A safety arrangement according to claim 1, wherein the safety arrangement incorporates at least two of the deformable elements, the elements being spaced apart, the processor being adapted to control the supply of gas to each deformable element individually.

11. A safety arrangement according to claim 10, wherein the two deformable elements carry a bumper or fender of the vehicle.

12. A safety arrangement according to claim 10, wherein the sensor senses the lateral position off-set of a potentially impacting object, the quantity of gas supplied to each deformable element being determined in dependence upon the lateral position off-set.

13. A safety arrangement according to claim 12, wherein if the lateral position off-set is substantial, the sensor arrangement will control the supply of gas so that gas is supplied only to one of the two deformable elements.

14. A safety arrangement according to claim 1, wherein the source of gas associated with the element is a multiple stage gas generator, the stages of the gas generator being activated in response to increasing values of the crash severity signal.

15. A safety arrangement according to claim 1, wherein the source of gas to supply gas to the element is a continuously variable supply, the quantity of gas supplied to the element being related to the magnitude of the crash severity signal.

16. A safety arrangement according to claim 1, wherein the deformable element is substantially cone-shaped.

17. A safety arrangement according to claim 16, wherein each deformable element is defined by a plurality of cylindrical open-ended tubular sections of increasing diameter which are connected together to extend from a sealed base to an end plate.

18. A safety arrangement according to claim 1, wherein the deformable element is substantially cylindrical, having a plurality of narrow neck portions that divide the deformable element into a plurality of collapsible sections.

19. A safety arrangement according to claim 18, wherein the deformable element has two neck portions which divide the deformable element into three collapsible sections.

20. A safety arrangement according to claim 1, wherein the deformable element has a substantially constant stiffness over a substantial part of its range of deformation.

21. A safety arrangement for use in a motor vehicle, the safety arrangement comprising a deformable element which defines at least one interior chamber and which is adapted to be mounted on the vehicle in a position where the element may be deformed in a crash situation, the deformable element being configured to be partially deformed in a crash, a source of gas connected to inject gas into the chamber and a sensor to generate, from one or more sensed parameters, a crash severity signal representative of the ejected severity of a crash, the sensor being connected through a processor to control the source of gas to supply the gas to the chamber in response to the crash severity signal representative of a severity of crash higher than a predetermined severity, wherein the supply of the gas causes the stiffness of the deformable element to increase, the deformable element has a predetermined range of deformation, and the sensor is connected to control the source of gas to supply gas to the chamber in response to the signal representative of a crash severity signal of a magnitude that would lead to the deformable element being deformed by at least 50% of its predetermined range of deformation.

22. A safety arrangement according to claim 21, wherein the sensor arrangement senses the relative speed between the motor vehicle and an impacting object, the crash severity signal being related to the sensed relative speed.

23. A safety arrangement according to claim 21, wherein the deformable element is provided with a controllable vent, the controllable vent being controlled by the processor in response by the sensor arrangement.

24. A safety arrangement according to claim 21, wherein the source of gas associated with the element is a multiple stage gas generator, the stages of the gas generator being activated in response to increasing values of the crash severity signal.

25. A safety arrangement according to claim 21, wherein the source of gas to supply gas to the element is a continuously variable supply, the quantity of gas supplied to the element being related to the magnitude of the crash severity signal.

* * * * *

UNITED STATES PATENT AND TRADEMARK OFFICE
CERTIFICATE OF CORRECTION

PATENT NO.       : 7,416,043 B2
APPLICATION NO.  : 11/832395
DATED            : August 26, 2008
INVENTOR(S)      : Bengt Pipkorn and Yngve Haland It is certified that error appears in the above-identified patent and that said Letters Patent is hereby corrected as shown below:

<u>On the Title Page, Item (73)</u>

Under Assignee, please change "Developments" to read --Development--.

<u>In the Claims</u>

In Claim 21, column 18, line 27, after "the" delete "ejected" and insert --expected--.

Signed and Sealed this

Fourteenth Day of April, 2009

JOHN DOLL
*Acting Director of the United States Patent and Trademark Office*